(12) United States Patent
Leonard

(10) Patent No.: US 6,654,838 B1
(45) Date of Patent: Nov. 25, 2003

(54) METHODS FOR PERFORMING BIT SENSITIVE PARALLEL BUS PEER ADDRESSING

(75) Inventor: Martin E. Leonard, Hollister, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 419 days.

(21) Appl. No.: 09/670,283

(22) Filed: Sep. 25, 2000

(51) Int. Cl.[7] .............................................. G06F 13/14
(52) U.S. Cl. ...................................... 710/240; 710/107
(58) Field of Search ................................ 710/3, 9, 107, 710/119, 240, 242; 370/461, 462, 431, 475; 340/825.52

(56) References Cited

U.S. PATENT DOCUMENTS 5,930,256 A * 7/1999 Greene et al.
6,205,155 B1 * 3/2001 Parrella et al.
6,353,614 B1 * 3/2002 Borella et al.
6,389,498 B1 * 5/2002 Edwards et al.

OTHER PUBLICATIONS

*Fundamentals of Digital Switching*, Edited by John C. McDonald, Plenum Press, NY and London, 1983, Chapter 5: Time–Division Networks by Matthew F. Slana, pp. 137–175.

PCI System Architecture, Third Ed., Tom Shanely and Don Anderson, MindShare, Inc., Addison–Wesley Publishing Company, 1995, Chapter 6: PCI Bus Arbitration, pp. 77–112.

"PCI Bus Interface Using AMD PLDs," Application Note, Advanced Micro Devices, Inc., Sunnyvale, California, 1995 (CP–13M–3/95–0).

* cited by examiner

*Primary Examiner*—Gopal C. Ray

(57) ABSTRACT

Given a parallel bus of data bits, a clock bit, a bid/busy bit, and an ack bit, and given a plurality of port devices coupled to the bus, a clock signal is used to synchronize messages on the bus and to divide the time domain into timeslots. No frame reference is used, and traffic on the bus is controlled using a protocol. Each port has an address which is one of the data bits of the bus. Ports bid for access to the bus by asserting their data line and the bid/busy line whenever the bid/busy line is not asserted by another. After seizing the bus, a source port keeps the bid/busy line asserted until it is done transmitting. When two or more ports bid for bus access at the same time, access is given to the port with the highest priority. Priority may be associated with the bit number.

25 Claims, 3 Drawing Sheets

FIG. 1 Internal Subscriber Line Connections

METHODS FOR PERFORMING BIT SENSITIVE PARALLEL BUS PEER ADDRESSING

BACKGROUND OF THE INVENTION

1. Field of the Invention

The invention relates to methods and apparatus used in systems for communicating data (e.g., voice, video and alphanumeric data), including but not limited to telecommunications systems, computer systems, etc. More particularly, the invention relates to methods and apparatus used to switch telephony and data signals without wasting bandwidth and without compromising the quality of telephony.

2. Brief Description of the Prior Art

Telephony switching was originally based on a system known as time division multiplexing (TDM). Although the actual implementation of TDM is quite complex, the concept of TDM is easy to understand.

Several relatively low frequency signals are interleaved to form a single relatively high frequency signal. The signals are mapped into what is referred to as a frame. Individual telephone connections are assigned a slot in the frame. Each slot corresponds to a destination (or a switch connection).

By nature, TDM provides a constant bandwidth allocation to each telephone connection. Although originally designed for telephony, TDM is also used in data switching. However, when used for data switching, TDM is inefficient. Bandwidth is wasted because most data communication does not require constant bandwidth.

Efficient data switching was initially provided through the use of packets. Packet switching techniques require an arbitration system whereby bandwidth is arbitrated among users. Some packet switching techniques utilize fixed length packets and some use variable length packets. Switch connections (or packet destinations) are specified in a part of the packet called the header.

Packet switching allows for the dynamic allocation of bandwidth to wherever it is needed and allows for "bursty" traffic, i.e. traffic which requires a large amount of bandwidth for a short amount of time and then requires little bandwidth.

As the popularity of data communication has spread, many different methods have been proposed for integrating telephony and data. Some of these proposals include ISDN (Integrated Services Digital Network), voice over ATM (Asynchronous Transfer Mode), ATM over SONET (Synchronous optical Network), and voice over IP (Internet Protocol).

The challenge in each of these proposals is to fairly allocate bandwidth without wasting bandwidth, while maintaining quality of service. However, each of these proposals is ultimately based on either TDM (ISDN and SONET) or packet switching (ATM and IP).

Those based on TDM continue to waste bandwidth and those based on packet switching provide poor quality of service during periods of congestion.

In conjunction with the methods proposed for integrating telephony and data, different apparatus have been developed. Although TDM traffic can be packetized and packet traffic can be provisioned over a TDM connection, different switches must be used for each type of traffic.

All digital electronic communication consists of payload data and control data. The payload data can not be readily distinguished from noise without some type of control information by which to interpret it.

To better appreciate the background of the invention it should be understood that there are two types of control information: element synchronization and transmission source synchronization.

Element synchronization provides a means of delineating the logical elements of the data stream, so bits, bytes, frames, etc. can be delineated. Transmission source synchronization, on the other hand, is necessary where more than one source can be simultaneously using the same transmission medium. The sources must be synchronized in time. If two sources attempt to send different data at the same time, the resulting ambiguity renders the data useless.

Both types of control information can be supplied in many forms, from a very simple time synchronization format built into the data stream, as exemplified by the RS-232 serial protocol, to a completely separate stream of data, complex in its own right, as in the PCI bus architecture.

Element synchronization can be achieved by one or more clock signals or by built-in (or on-line) timing.

An example of built-in timing is the RS-232 serial data signal. The RS-232 serial stream, like most digital data, is composed of bits and bytes. A bit can be either logical one or zero; it can have no other value. This can be represented electrically by two voltage levels, two frequencies, presence or absence of a voltage, etc. Eight bits compose a byte. Most digital data is composed of strings of bytes.

An RS-232 stream delineates the beginning of each byte of data by a rise of voltage to a predetermined MARK level (the START bit), followed by eight bits, each being present for a certain length of time, and terminated by a STOP bit of a certain length. This element synchronization makes it possible to extract the intelligence from the data stream by taking samples of the line voltage at periodic intervals following the leading edge of the START bit. This sampling interval is determined by the baud rate of the transmitting device. There is no need to provide a separate clock signal to mark the individual bits.

In contrast, in the PCI bus architecture, discrete time periods are marked off by a separate CLOCK signal. The timing of the clock pulses allows the receiving station to discern the individual bits and bytes of the stream of data on the data transmission bus. In a parallel bus architecture of this type, multiple channels carry data simultaneously, with the bit timing of all channels synchronized to the same external clock.

Transmission source synchronization mechanisms can also be either built-in ("in band") or external ("out of band"). As mentioned above, if more than one source transmits data into the medium at the same time, unless the data is exactly the same for all sources, the result will be useless noise. Therefore, some of the resources used in the data transmission process must be used for controlling the flow of data.

In other words, there must be some way to determine who can transmit at any particular time.

Resources that are used only for the control of the data flow are referred to as "overhead". These resources are of no value to the ultimate users of the system other than as conveyors of the payload data. The source synchronization overhead, necessary to prevent or compensate for simultaneous transmission by more than one device, can become a significant portion of the available bandwidth; that is, the overall data carrying capacity of a particular transmission medium, such as a fiber optic link or a radio transmission frequency spectrum. Although necessary, the synchronization control overhead is not desirable, since the overhead contributes to the expense of the system.

In some transmission systems, the bandwidth is divided into channels, wherein the data is carried in several parallel "pipes". Parallel means that the data is carried simultaneously in all channels.

In other system, data is carried in a single "pipe", in which only one basic element ("bit") is transmitted at a time.

When the medium used carries only a single bit at a time, as in a high-speed serial system (e.g. Ethernet), source synchronization involving several originating sources is a serious problem. If several sources begin transmitting messages at the same time, no other station in the system knows where the message is originating.

In addition, the data of the various transmitting sources is combined in a completely random fashion so that all intelligence is lost. Of necessity, a system of this type must build the source synchronization mechanism into the transmission protocol because there is no external method of controlling access.

The controls for source synchronization that are built-in involve either some method of rotating control of the medium to each source or, alternatively, some method of seizing control of the medium without interfering with or being interfered with by another source.

The former method is embodied in a token ring system, in which a logical "token" is passed around and only the source possessing the token is allowed to transmit. This method requires that some of the available bandwidth be dedicated to the token handling process.

In the latter method, exemplified by Ethernet, each transmitting source monitors the medium for activity before attempting to transmit. When the source determines that activity has ceased, it begins transmitting.

A collision can occur when two sources attempt to start transmitting at the same time. The two sources must be able to detect the collision and then "back off" from the medium for a period of time before retrying. As traffic on the medium increases, the incidence of collisions increases dramatically, causing an effective loss of bandwidth.

External controls refers to an architecture in which the controls for transmission source synchronization are provided by a signal or signals that are in some way separate from the signals that provide the data that is to be transferred ("out of band"). Two examples, described in more detail below, are the PCI bus and a TDM bus. In both of these bus systems, the control signals are distinguished from the data signals by being on different channels. The main advantage of this type of architecture is that little or none of the data bandwidth is expended for control. The disadvantage is the cost of the additional hardware required.

The PCI bus architecture is typical of parallel bus architectures in which more than one source is capable of transmitting simultaneously on the same bus. It employs a source synchronization mechanism to prevent collisions and a clock signal to delineate the bit periods. The source synchronization signals are carried on a physically different set of signal traces from those which carry the data. These control signals provide a means for an arbiter to communicate with contending sources. The arbiter determines which source will have access to the data bus when the bus becomes available and gives that source permission to transmit at that time.

A Time Division Multiplexed architecture in its broader sense is, as indicated hereinbefore, a system that divides data bandwidth into discrete time segments, or "slots", which are allocated for use by the transmitting sources. The meaning or value of the data is determined by its relative temporal position as measured by element control signals which include a bit clock and a frame clock.

The slots of time within the frame are allocated to the various sources as needed.

In summary, control signals add complexity to the transmission medium architecture, resulting in increased bandwidth requirements or additional investment in hardware, or both. These control signals are carried either on the transmission medium itself or a supplementary medium, or both. Heretofore the only apparent solutions were either overbuilding bandwidth capacity for a given amount of payload data or investing a significant amount in supplementary hardware and control software.

SUMMARY OF THE INVENTION

It is therefore an object of the invention to provide methods and apparatus for performing telephony and data communication more efficiently.

More particularly, it is an object of the invention to provide methods and apparatus for more efficiently utilizing bandwidth in telephony, data communications and combined telephony/data communications applications.

It is a further object of the invention to provide a communications bus that accommodates a plurality of users and arbitrates control of the bus quickly and efficiently.

It is another object of the invention to provide methods and apparatus for telephony, data communications and combined telephony/data communications applications which maintains the quality of service while fairly allocating bandwidth.

It is still another object of the invention to provide methods and apparatus for telephony, data communications and combined telephony/data communications applications in which there is no possibility of data collisions.

It is yet another object of the invention to provide methods and apparatus for the aforementioned applications which do reduce bus management overhead when compared with traditional parallel bus management techniques.

It is another object of the invention to provide methods and apparatus for the aforementioned application which are flexible and easily expandable.

In accord with these objects which will be discussed in detail below, the methods and apparatus for combined telephony and data communication of the present invention include a parallel bus of, preferably, 64 data bits, one clock bit, one bid/busy bit, and one acknowledge (ack) bit.

The invention further includes a plurality, preferably 64, port ("bus user") devices coupled to the bus. Each port device includes bus interface circuitry, port control circuitry, and line interface circuitry. The bus interface circuitry includes input and output FIFOs and control logic. The port control circuitry includes a processor and RAM. The line interface circuitry includes an input line receiver and deserializer and an output line driver and serializer.

The control logic in the bus interface of the circuitry (the preferred embodiment of the invention being described herein) includes 66 line drivers for driving the 64 data lines, the bid/busy line, and the ack line; and 67 line receivers for receiving all of the lines including the clock line.

According to the presently preferred embodiment, each line is pulled up to VCC by a resistor so that a non-driven line is at VCC. The clock signal is used to synchronize messages on the bus and to divide the time domain into timeslots (one timeslot being the reciprocal of the clock frequency).

According to the invention, no frame reference is used and traffic on the bus is controlled using a protocol.

Further, according to the preferred embodiment of the invention, data being received from the bus is stored in the input FIFO automatically, clocked in at a rate equal to the bus clock frequency. Data is transmitted onto the bus at the clock rate, preferably 20 megahertz, giving a total transmit rate of 1.2 gigabits per second.

The protocol of the bus is essential for the most efficient use of the bandwidth. All messages have a common format which complements the rules of protocol. The rules of protocol are:

(1) All ports have an assigned address which correlates to one of the data lines of the bus, i.e. 0–63 in the presently preferred embodiment.

(2) The value of the address is directly related to the priority of the port, e.g. 1 has priority over 2.

(3) No port that has not seized the bus can transmit on the bus if the BID/BUSY line is low (asserted).

(4) All data packets must be at least two clock cycles in length (to achieve maximum efficiency).

(5) A port of fewer than 64 bits will not see a bid by a port with an address that falls out of the range of its receive bus. The port with the higher number of receive/transmit bits, however, will be able to see the other's bid and cease attempting to seize the bus.

(6) All ports must respect the priority scale in the bid process.

(7) All ports must respect the current state of the BID/BUSY line and maintain a high impedance output on the data bus lines until the transmitting source releases the BID/BUSY line.

When the BID/BUSY line is allowed to go HIGH (inactive), any port can attempt to seize control of the bus on any succeeding cycle so long as no other port seizes control. If a port wishes to seize control of the bus, it must "bid" by placing a low on the data line that corresponds to its address (0–63) for one clock cycle at the beginning of the next clock cycle and place a LOW on the BID/BUSY line simultaneously. During the clock cycle in which the port is "bidding" it must sense the other data lines for the presence of bids by other ports. If two ports bid simultaneously, the port with the higher priority address obtains control. Priority is directly related to the binary value of the data line, 0 being the highest priority.

Additionally, according to one embodiment of the invention, ports having fewer data bits than the width of the bus are assigned higher priority than the ports having full data width. For example, using a 64 bit data bus, ports coupled to 5 data lines would have a priority greater that ports connected to 10 data line; ports connected to 10 data lines would have priority greater ports connected to 50 data lines, etc. Within each grouping (10 bit ports, 50 bit ports, etc.), address would control priority.

During the clock cycle following bidding, the controlling port asserts the bus line(s) corresponding to the address(es) of the destination ports. If a port reads its own address during this clock, it asserts the ACK line during the next clock cycle and then immediately release it.

The transmitting port keeps asserting the BID/BUSY line during the entire transmission of the message. The transmitting port releases the BID/BUSY line at the end of the third clock cycle if the ACK line does not go LOW during the third time slot. The BID/BUSY line goes HIGH at the end of the clock cycle during which the last byte is transmitted. The transition of the BID/BUSY voltage to HIGH signals the receiving port that the data packet is complete. It also signals other ports that the bus is now available for bid.

According to the invention, the ports coupled to the bus are similar to the line modules of a TDM based exchange in that they accept analog lines and convert the analog signals into digital data according to the usual PCM encoding rules. The digital data is collected into packets of a suitable length (100 bytes for conversational voice) and transmitted across the bus to one or more ports where it is re-transmitted along the associated link in the appropriate form. Non-voice data is transmitted across the bus without alteration. An important characteristic of all voice line modules is that they search for voice packets containing silence and discard them eliminating the unnecessary use of bus bandwidth.

During the third clock cycle, in addition to asserting the lines described above, the source transmits a byte indicating the type of data to be transmitted.

The switch according to the invention performs the call processing in any one of three ways:

(1) A dedicated port on the bus is notified by another port that call processing services are required.

The dedicated port generates the necessary tones or D-channel messages to establish the call, using data from the notifying port.

(2) The port, itself, has the capability of performing the call process function. This will more usually be the case when the port is a Digital Subscriber Line Integrated Circuit (DSLIC).

(3) The call processing is performed by an external processor attached to the bus via a dedicated port.

The methods and apparatus of the invention actually become more efficient as usage increases. Because the addressing protocol of the invention is efficient, ports govern themselves with respect to bus access and there is no contention for control when a port has relinquished use of the bus. Bidding is done in a controlled manner, with the port having the highest priority allowed to use the bus whenever two or more ports bid for access. Ports can be configured to handle any kind of traffic from POTS (plain old telephone service) to broadband data service.

The bus protocol imposes very little overhead on the packet traffic. The bus can be designed as a relatively inexpensive backbone capable of accepting a large number of ports. The basic configuration can be implemented relatively inexpensively. Expansion is modular, with processing being added with each new module in the exact amount required. The basic design is stackable, by adding connecting buffer ports between adjacent units. Priority of bus use is automatic. The bus is so designed that ports of less than 64 bits can operate on the bus without conflict.

Additional objects and advantages of the invention will become apparent to those skilled in the art upon reference to the detailed description taken in conjunction with the provided figures.

DETAILED DESCRIPTION

The invention will be described hereinafter, for the sake of illustration only, in the context of a presently preferred embodiment that can be used to achieve a 1.2 gigabits per second communication bus.

Figure 1:
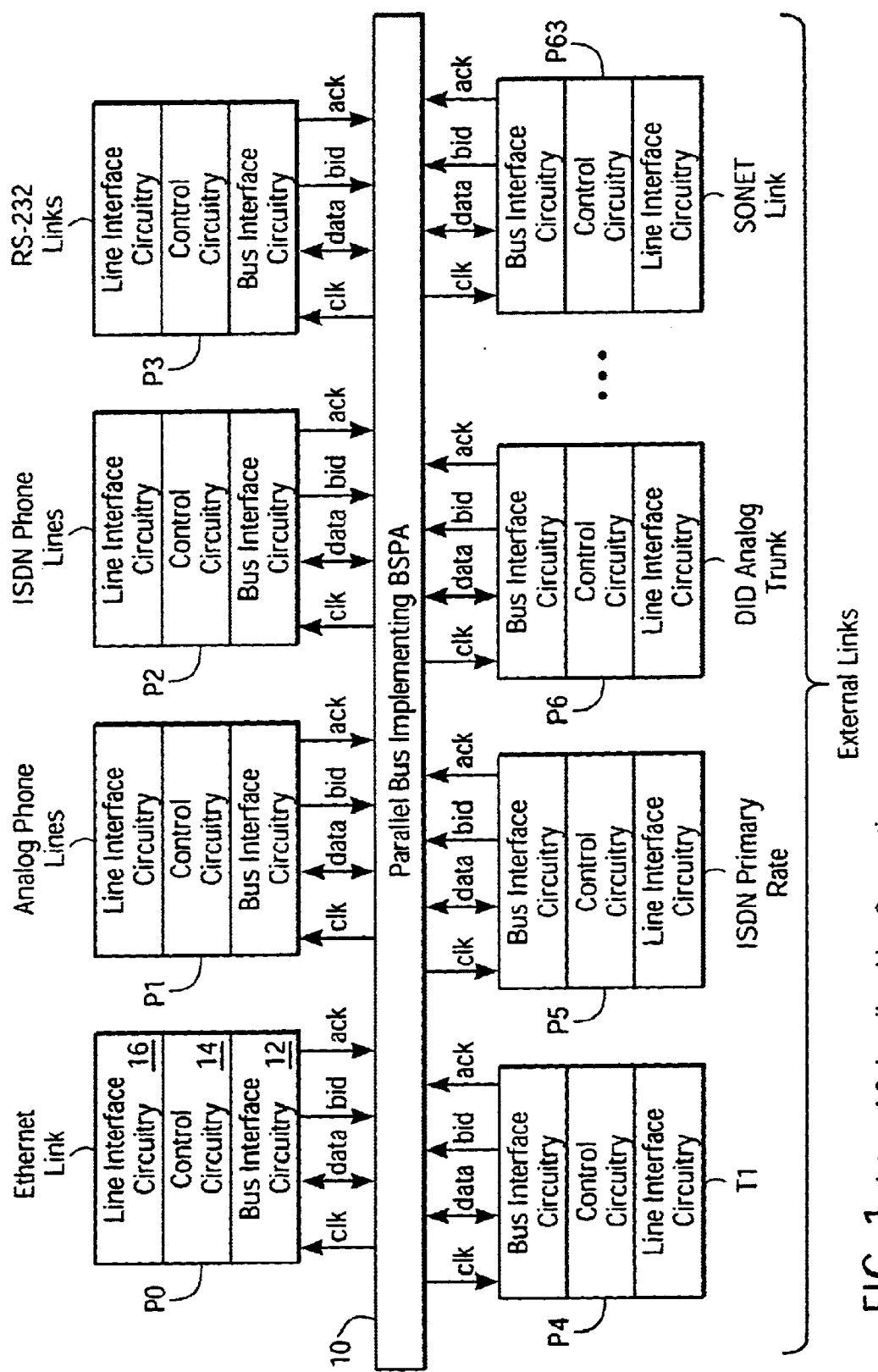
FIG. 1 is a high level block diagram of a bus system according to the invention.
Figure 2:
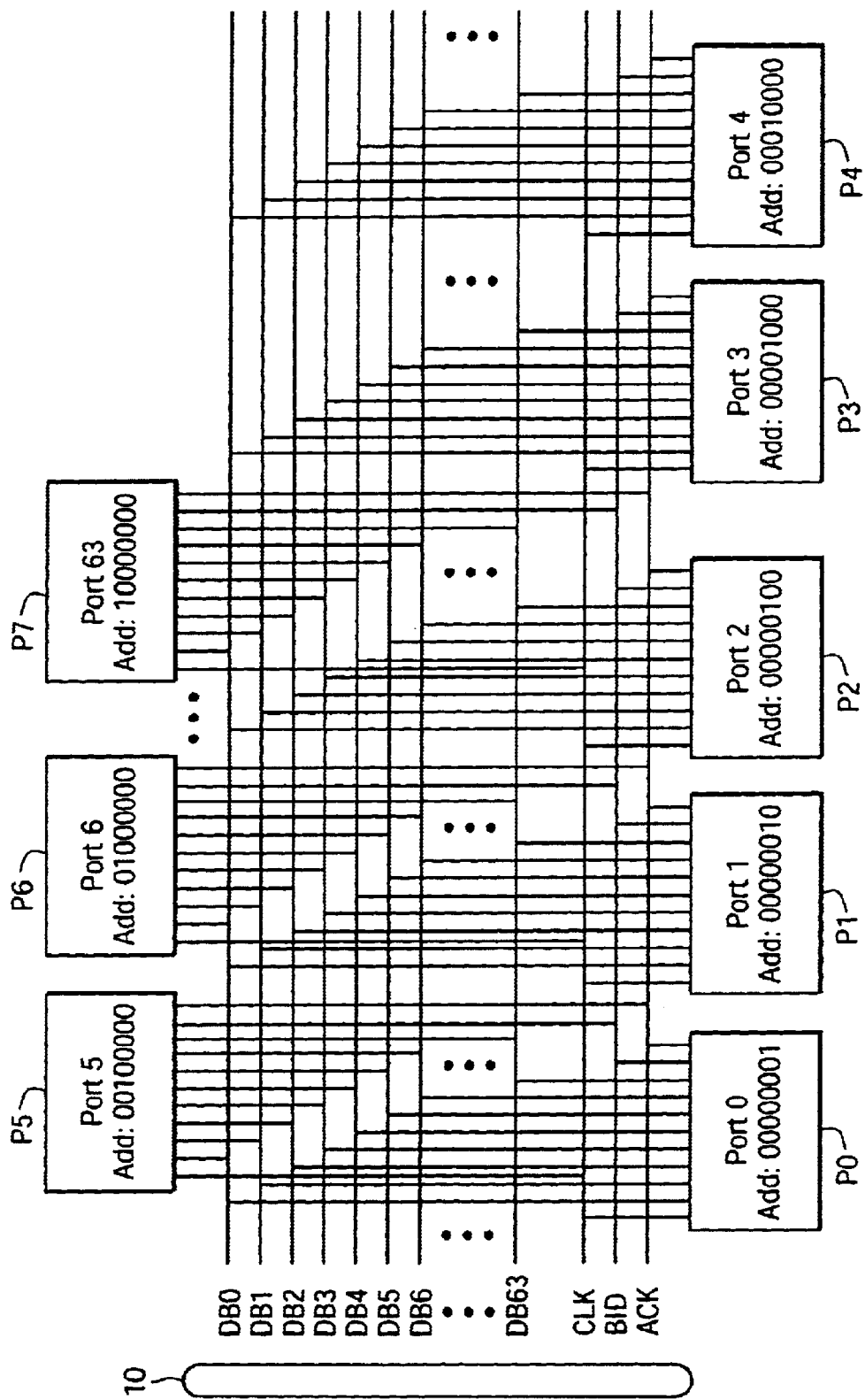
FIG. 2 is a high level block diagram of a bus system according to the invention illustrating a 64 bit data bus.
Figure 3:
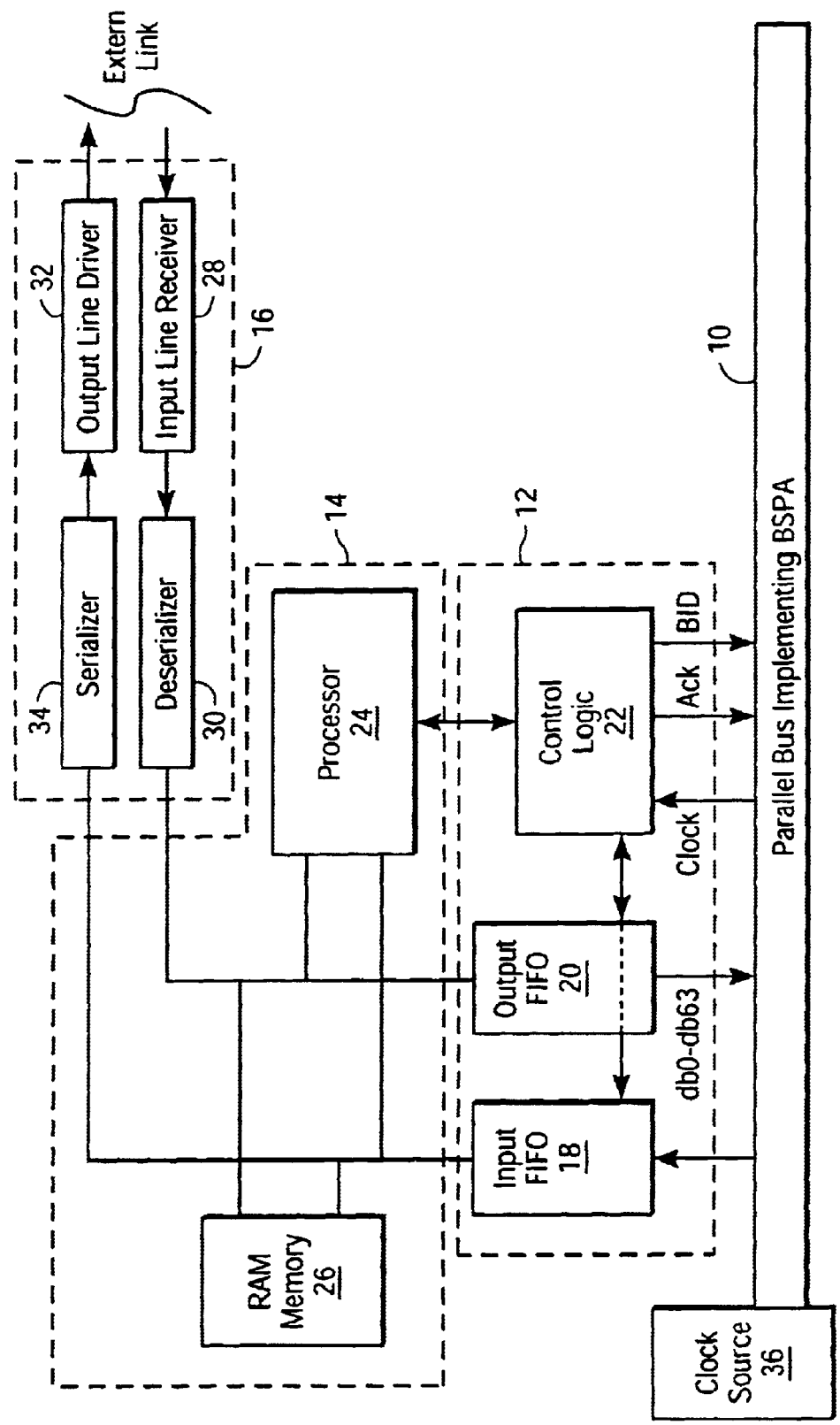
FIG. 3 is a more detailed view of a port coupled to the bus.

Referring now to FIGS. 1–3, the apparatus of the invention includes a parallel bus 10 of, preferably, 64 data bits, one clock bit, one BID/BUSY bit, and an acknowledge ("ack") bit.

The apparatus further includes a plurality, for example 64, port devices P0–P63 coupled to the bus. Each port device includes bus interface circuitry 12, port control circuitry 14, and line interface circuitry 16.

FIG. 2, as indicated hereinabove, illustrates in the form of a high level block diagram, an exemplary bus system according to the invention illustrating a 64-bit data bus. Data bus 10 in FIG. 2 is shown to include 64 data lines, DB0–DB63; a clock bit (line); a BID/BUSY bit; and an acknowledge bit. FIG. 2 goes on to illustrate 64 ports, P1–P63, (assigned, according to the illustrative embodiment of the invention, unique 64 bit addresses 000 . . . 1 through 100 . . . 0, respectively), attached to bus 10.

As shown in FIG. 3 the bus interface circuitry 12 includes input FIFO 18, an output FIFO 20 and control logic 22. The port control circuitry 14 includes a processor 24 and RAM 26. The line interface circuitry 16 includes an input line receiver 28 and deserializer 30 and an output line driver 32 and serializer 34.

The control logic 22 in the bus interface circuitry 12 includes 66 line drivers for driving the 64 data lines, the bid/busy line, and the ack line, and 67 line receivers for receiving all of the lines including the clock line.

According to the presently preferred embodiment, each line is pulled up to VCC by a resistor so that a non-driven line is at VCC. The clock signal is supplied by a clock source 36 and is used to synchronize messages on the bus and to divide the time domain into timeslots (one timeslot being the reciprocal of the clock frequency).

According to the presently preferred embodiment, a 20 MHz clock is used thereby providing a total bus bandwidth of 1.28 gigabits. According to the invention, no frame reference is used and traffic on the bus is controlled using a protocol.

Further, according to the invention, data being received from the bus 10 is stored automatically in the input FIFO 18 of each port, clocked in at a rate equal to the bus clock frequency. If the data is not destined for the port, the control logic 22 discards it. Data is transmitted onto the bus by one port at a time according to a protocol The protocol of the bus is essential for the most efficient use of the bandwidth. All messages have a common format which complements the rules of protocol. As indicated hereinbefore, the preferred rules of protocol are:

(1) All ports have an assigned address which correlates to one of the data lines of the bus, i.e. 0–63 in the presently preferred embodiment.
(2) The value of the address is directly related to the priority of the port, e.g. 1 has priority over 2.
(3) No port that has not seized the bus can transmit on the bus if the BID/BUSY line is low (asserted).
(4) All data packets must be at least two clock cycles in length.
(5) A port of fewer than 64 bits will not see a bid by a port with an address that falls out of the range of its receive bus. The port with the higher number of receive/transmit bits, however, will be able to see the other's bid and cease attempting to seize the bus.
(6) All ports must respect the priority scale in the bid process.
(7) All ports must respect the current state of the BID/BUSY line and maintain a high impedance output on the data bus lines until the transmitting source releases the BID/BUSY line.

When the BID/BUSY line is not being asserted by any of the ports, any port can attempt to seize control of the bus on any succeeding cycle so long as no other port seizes control. If a port wishes to seize control of the bus, it must "bid" by placing a low on the data line that corresponds to its address (0–63) for one clock cycle at the beginning of the next clock cycle and place a LOW on the BID/BUSY line simultaneously. During the clock cycle in which the port is "bidding" it senses the other data lines for the presence of bids by other ports.

The following sequence describes the events that must take place for a port to transmit a packet of data:

(1) Clock Cycle One. All ports wishing to bid assert the data line corresponding to their address. All ports bidding read the data lines to determine if other ports have also bid. If two or more ports bid for the bus during the same clock cycle, the highest priority port gains control.

(2) Clock Cycle Two. During the next clock cycle following the bid cycle, the controlling port asserts the BID/BUSY line and asserts the data line(s) that correlate to the port(s) to which it desires to transmit. These are the destination addresses. Other ports which lost the bid release their address line.

(3) Clock Cycle Three. The controlling port transmits the first eight bytes of data during this clock cycle following the destination address transmission. Simultaneously, all destination ports assert the ACK line if they are able to receive the data. All destination ports release the ACK line at the end of Clock Cycle Three.

(4) Clock Cycle Four. If the ACK line was not pulled to a LOW by a receiving port during Clock Cycle Three, the controlling port relinquishes control of the bus by releasing the BID/BUSY line at the beginning of Clock Cycle Four, and the bidding process is allowed to begin again.

(5) Clock Cycle Five until End of transmission. If the ACK line was pulled low in clock cycle three, the transmitting port continues to assert a LOW on the BID/BUSY line and sends data across the bus each clock cycle until the packet has been completed. It releases the LOW on the BID/BUSY line at the beginning of the clock cycle when the last data byte is transmitted. The bus then becomes IDLE.

According to the presently preferred embodiment, the first eight bytes of data in a packet contains information related to the data body following in the same packet. The types of data packets to be sent are either transparent to the receiving port, which acts as a pure pipeline in this case, or they are directed to the receiving port. In the latter case, the receiving port accepts the packet and implements it in a programmed manner. This administrative type of data can be used by a port module to route incoming link traffic to the proper modules(s) on the bus.

According to the invention, the ports coupled to the bus may be similar to the line modules of a TDM based exchange in that they can accept analog lines and convert the analog signals into digital data according to the usual PCM encoding rules. The ports may also be directly digital compatible. The digital data is collected into packets of a suitable length (100 bytes for conversational voice) and transmitted across the bus to one or more ports where it is re-transmitted along the associated link in the appropriate form. Non-voice data is transmitted across the bus without alteration. An important characteristic of all voice line modules is that they search for voice packets containing silence and discard them eliminating the unnecessary use of bus bandwidth.

As mentioned above, the switch according to the invention performs the call processing in any one of three ways:

(1) A dedicated port on the bus is notified by another port that call processing services are required.

The dedicated port generates the necessary tones or D-channel messages to establish the call, using data from the notifying port.

(2) The port, itself, has the capability of performing the call process function. This will more usually be the case when the port is a DSLIC.

(3) The call processing is performed by an external processor attached to the bus via a dedicated port.

The methods of the invention may be referred to as Bit Sensitive or Bit Significant Peer Addressing. The method permits the control of the flow of data across the bus without the use of an extensive external hierarchical control architecture and without significantly impacting bandwidth by built-in control overhead.

Bit sensitive or bit significant means that each port on a bus of width n is addressed by a single unique bit of the n-bit bus. Port 0's address is ". . . 001"; Port 1's address, ". . . 010"; Port 2's address is ". . . 100", etc.

In its most efficient form, the number of ports on the bus is not greater than n, the width of the bus. The data/address lines of the bus can be used to carry binary encoded address data as usual within the data packets themselves. For purposes of addressing a port on the bus, the addresses are single bit addresses. By holding to this rule, it is possible, with the use of the BID/BUSY line, to address all of the ports in one cycle with no ambiguity. When the bid/busy line is asserted, the data on the bus is recognized as a composition of port address bits (bids). All ports then read the bus and determine which other port is bidding for use of the bus.

The data bus seizure method of the invention is unique in its simplicity. When the bus is idle (bid/busy line not asserted), any port may attempt to seize control. If more than one port attempts to take control of the bus during the same bid clock cycle, the port with the highest priority gets control, and any other port relinquishes control.

The key to the success of this bidding method is that any port can drive a single data trace to a low while, at the same time, reading the bus contents to determine if another port is doing likewise on another trace. The bid cycle is the only time that multiple ports can drive the data bus simultaneously.

The term "peer addressing" reflects the relationship that exists among the ports on the data bus in this architecture. Although there is a priority arrangement for bus access, each port acts as an independent agent in its approach to using the bus. The bus, in effect, becomes a public vehicle for use by any port to communicate with any other port or ports for any reason. So long as the correct protocol for bus seizure is followed, the bus is available to any port. In conjunction with the bit sensitive addressing, peer addressing, in effect, becomes analogous to a LAN structure. Unlike the LAN, however, these peers are able to efficiently negotiate control of the bus so that bandwidth use efficiency remains constant, regardless of traffic.

Peer Addressing also means that every port controls its own bus access, elegantly relinquishing control of the bus to higher priority ports when contention arises. There is no arbiter, nor is there a bus master of any sort. The ports stand as peers on the bus, bidding for access to it when they so wish; and accepting transmitted data when it is addressed to them. There are no interrupts used in peer addressing. There is no external arbitration. The bid process takes place very quickly (one clock cycle). The port that wins the bid takes control of the bus and immediately begins transmitting. The port(s) to whom the data is addressed begin(s) accepting it immediately.

In the embodiment described above, the main data traffic stream between the ports on the bus is transported by the same bus used in the control process. The addressing scheme of the invention may also be used in a switch where the parallel bus is only used for control and a separate bus or an external medium, such as a serial optical link is used to transport data. In such a case, the parallel bus architecture used in the bidding process has the sub- function of providing a link for exchanging maintenance, configuration and other system control information.

According to the presently preferred embodiment, each port transmits data to the bus via tri-state drivers capable of driving n loads. Pull-ups on the bus assure that the data traces are never electrically ambiguous, but always at either a logically HIGH or LOW level. Data transmitted on the bus is synchronized to the CLK signal.

Bit synchronization on each signal trace is achieved by writing data to the bus at the rate of the CLK signal. The byte synchronization is implied by the physical arrangement of the traces, as is usual in a parallel bus.

The bandwidth available in bits per second is determined by multiplying the clock rate times the bus width in bits. Source synchronization is provided by each port synchronizing itself as a source of data on the Data Bus by manipulation of the BID/BUSY line, and the Data lines. As with Ethernet, ports that wish to access the data bus wait for the bus to be idle, then bid for possession of the bus. Unlike the method used by Ethernet, there are no "collisions" because each port has its own address line.

Contention is resolved in an orderly manner with no loss of bandwidth. In the usual case, by the end of the third clock cycle the matter of who possesses the bus and who will receive the data has been decided, and data begins to be transferred.

If the data traffic is carried on an external medium other than the parallel bus used for bidding and addressing, the sequence of operations is slightly altered and separate bid and busy lines are provided. In this case, the BID process on the parallel bus is undertaken while data traffic is currently active on the external data bus. The winner of the bid process waits until the BUSY signal becomes inactive, holding the BID signal true until that time, then begins transmitting on the external medium.

It then release the BID signal, allowing other ports to bid for access to the external medium when it becomes available again. The parallel bus also serves to carry control messages between ports independently of the data traffic on the external medium. The port that wins the bid transmits the control data on the parallel bus in the manner described above while holding the BID signal active. When the port has completed the transmission of the control information, it releases the BID signal, and bidding for the control of the external data medium resumes.

An alternate embodiment of the invention does not require an ack line. This embodiment of the invention is illustrated hereinbelow with reference to Table 1.

TABLE 1

| Clock Period | CONT. Signal | DATA BUS CONTENTS | COMMENTS |
|---|---|---|---|
| 1 | — | 1111111111111111 | BUS is idle as indicated by BUSY = FALSE |
| 2 | BID | 1111111111111110 | Port 0 drives its address trace & BID low |
| 3 | BID | 1111111111110011 | Port 0 drives destination 2 & 3 add. traces low |
| 4 | BID | 1111111111111011 | Port 2 responds to indicate acknowledge |
| 5 | BUSY | xxxxxxxxxxxxxxxx | Port 0 places first 16 bit word of data on bus |
| 6 ... N + 3 | BUSY | xxxxxxxxxxxxxxxx | Port 0 continues to transmit N words of data |
| N + 4 | — | xxxxxxxxxxxxxxxx | Port 0 transmits last word of data |
| N + 5 | — | 1111111111111111 | Bus is idle |

Table 1 illustrates an example using a 16-bit bus. In this example, port 0 wishes to transmit to ports 2 and 3. At clock period 1 it sees that the BID/BUSY line is not asserted. In clock period 2 it asserts the BID/BUSY line and asserts (pulls low) data bit 0, its own address bit.

In clock period 3 Port 0 drives data bits 2 & 3 low, corresponding to the address bits of ports 2 and 3. In clock period 4 port 2 drives data bit 2 low to indicate its readiness to receive transmission.

It will be appreciated by those skilled in the art that in this embodiment of the invention acknowledgement requires an additional clock cycle. However, this embodiment of the invention enables the separate acknowledgement from multicast addresses. This feature permits the controlling port to decide whether to transmit data when fewer than all the addressed ports have responded with an acknowledgement signal.

In clock period 5 Port 0 begins transmitting the message on the data bus. The message is N words long, so the last word is transmitted during clock period N+4. During this same clock period, Port 0 allows the BID/BUSY signal to go HIGH or false, signifying that the data bus will be available after this clock cycle. At clock period N+5, the bus is again idle.

As mentioned above, the concepts of the invention may be implemented in several ways. The examples above may be referred to as "Congruent Payload and Control Data Bus" where the number of ports is no more than the number of bits on the bus.

An alternative embodiment permits the number of ports to be greater than the number of bits on the bus. This system requires that the bidding process be extended for more than one clock cycle. Each clock cycle of the bidding process multiplies the number of ports according to m*n where m is the number of clock cycles and n is the width of the bus. For example, in a system with a 64-bit bus and 128 ports, ports 0–63 bid during the first cycle and ports 64–127 bid during the second cycle.

Another way of stating this feature is that whenever the number of ports, x, is greater than the number of data lines n, arbitration for control of the bus is completed in the greatest integer value of x/n clock cycles. Thus 65 ports attached to a 64 bit bus would require 2 clock cycles, etc.

Also as mentioned above, the data transfer medium may be separate from the bus through which bidding and addressing is performed. For applications involving very high speed data busses, an external data pipe, such as a fiber optic serial bus or an extremely high speed parallel data bus may be used. The control of the data pipe for transmission of the next packet is determined during the time that a packet is presently being transmitted.

The invention can also be used with very long control busses in which the propagation time of the clock signal exceeds the period of the clock cycle. In this case, the data appearing at a port will not be synchronized to the clock edge if the data source and the clock source are different distances from the receiving port.

For example, if a port at one end of the very long bus is transmitting to a port at the other end of the bus, while the clock originates halfway between them, at the center of the bus, the clock wave propagates toward both ports from the clock source and arrives at both at the same time. The receiving port begins to look for the data value associated with that clock cycle when the clock edge arrives. The transmitting port begins to transmit at that time; but the edge of the transmitted data does not arrive at the receiving port until later.

If the propagation time of the clock pulse to the transmitting station is ⅓ of a clock cycle, the second ⅓ of the clock cycle will have elapsed by the time the data edge gets back to the center of the bus from the transmitting station. The data then travels to the receiving station from the center of the bus during the last ⅓ of the clock cycle. Therefore, the receiving station will latch the bus contents just as the leading edge of the data is arriving.

If the propagation time of the clock from the clock source to the ports exceeds ⅓ the clock period, the receiving station will not consistently read in the correct bit. The clock edge will fall on an indeterminate state of the data.

The solution to this problem is to have each port drive the clock during the time that it is transmitting. Thus the clock edge and the data edge will arrive at the same time, no matter how much distance between the transmitting and receiving ports. Upon completion of transmission, a port will cease driving the bus.

The invention is also applicable to very, very fast parallel busses. In a very very fast bus, the logic controlling the access to the bus will sometimes not be capable of determining the winner of the bid process within one clock cycle. This would probably be the case on a backplane running at 160 MHz, for example. Then the duration of the bidding process must be extended for one or more clock cycles to allow time for the control logic to determine the winner of bidding.

The second example, provided below, describes the bidding, addressing and data transmission process in a system in which the payload data is carried on a medium (a payload data path) external to a separate bus for controlling bidding and addressing. The second example may best be understood with reference to Table 2, below, where separate bid and busy lines are provided.

TABLE 2

| CLK | CONT. SIGS | DATA | COMMENTS |
|---|---|---|---|
| 1 | — | 11111111 | BUS is idle as indicated by BUSY = FALSE |
| 2 | BID | 11111100 | Ports 0 & 1 drive their address traces & BID low |
| 3 | BID | 11111011 | Port 0 drives destination 2 address trace low |
| 4 | BID | 11111011 | Port 2 responds to indicate acknowledge |
| 5 | BUSY | 11111111 | Port 0 transmits on external data bus (not shown). |
| 6 | BUSY/BID | 11111101 | Port 0 continues transmitting. Port 1 bids. |

TABLE 2-continued

| CLK | CONT. SIGS | DATA | COMMENTS |
|---|---|---|---|
| 7 | BUSY/BID | 11110111 | Port 0 continues; port 1 drives destination address |
| 8 | BUSY/BID | 11110111 | Port 3 responds to indicate acknowledge |
| 9 ... N + 3 | BUSY/BID | 11111111 | Port 0 continues; port 1 holds BID active |
| N + 4 | —/BID | 11111111 | Port 0 transmits last word of data; releases BUSY |
| N + 5 | BUSY/— | 11111111 | Port 1 drives BUSY, begins xmitting, releases BID |

In this example, port 0 wishes to transmit to port 2 in a system using a control bus 8 bits wide. Port 1 wishes to transmit to port 3. Port 0 begins the process.

In clock period 2 Port 0 places a low on BID and data bit 0, its own address bit; while port 1 places a low on data bit 1. In clock period 3 Port 0 drives data bit 2 low, corresponding to the address bits of port 2. Port 1 withdraws and awaits the next BID process.

In clock period 4 port 2 drives data bit 2 low to indicate its readiness to receive transmission. In clock period 5 Port 0 begins transmitting the message on the data bus. The message is N words long, so the last word is transmitted during clock period N+4.

In clock period 6 port 1 again bids by making BID active and placing a low on bit 1. In clock period 7 port 1 places a low on bit 3, the address of port 3. In clock 8, port 3 places a low on its address trace to indicate acknowledgement. While port 0 is transmitting, port 1 continues to hold the BID signal active, signifying its intention to use the external data bus when port 0 has completed its transmission.

At clock period N+4, port 0 transmits the last element of data on the external data bus. During this same clock period, Port 0 allows the BUSY signal to be HIGH or false, signifying that the data bus will be available after this clock cycle.

At clock period N+5, port 1 drives the BUSY signal low and begins transmitting its data on the external data bus. It releases the BID signal, allowing the other ports on the bus to begin bidding for the next access to the external data bus.

There are certain minimum hardware requirements to implement this invention. In addition to the previously mentioned bus driver fanout (the number of ports each bus driver is able to sink), it is necessary that the ports be able to drive data onto the bus and receive data from the bus at the CLK rate.

An exemplary way to implement these functions is through the use of hardware FIF0's (memory devices that can simultaneously receive data at one rate of speed and transmit it out on a different path at a rate of speed not dependent on the input speed). Another requirement is that the bidding process must be implemented as a hardware state machine.

The decision-making process is simply too fast for a software controlled state machine. None of these hardware requirements is particularly demanding, in the light of current state of the art technology. It is likely that a single chip can be used to perform all bus access functions.

For very high-speed busses, with clock rates in excess of 100 Mhz, several semiconductor companies have introduced transceiver families capable of providing the necessary implementation. Gunning logic is the approach of choice of TI and Fairchild, in particular.

There are two inherent advantages of a system that utilizes the methods of the invention. First, the system will be extremely flexible in its functionality. Completely new functions can be introduced into the system without any impact on existing functions. This flexibility is possible because the messages sent across the bus are not limited in their content.

A port embodying new functions can obtain access to the bus without any change to the existing ports. Those ports capable of doing so can then take advantage of the new functionality. Second, it is evolutionary in all dimensions. That is, it can evolve in terms of bandwidth by increasing clock speed or bus width; in terms of port number by adding more ports, lengthening the bus physically; it can evolve in terms of functionality by adding additional ports that have entirely new functions, such as an ISDN interface or an optical data storage system. It can evolve from a very simple, humble system providing a few pedestrian applications into a giant switch serving data and telephony for thousands; and it can do this a little at a time, in easy, incremental steps.

The advantages of the invention are most fully realized in a packet message environment. The longer the individual packet, the more efficient the use of bandwidth. Therefore, most applications will involve some type of packet messaging architecture. This is not necessarily a disadvantage because the invention is so efficient in the handling of packetized data, it makes packet messaging feasible for many applications where packet formats previously would have been impractical. As an example, in a telephony environment, packets of voice data can be transmitted on the bus very efficiently maintaining a high quality of service.

A PBX based on the invention is one practical application. Such a system can be very easily extended to incorporate server functions by adding additional functional modules on the bus. In this architecture, the TDM bus would be confined to individual line interface modules. The telephony interface modules have onboard DTMF detection functions synchronized to the external lines. A processor handles layer 3 control messages and directs the data into packets for transmission to the appropriate port on the data bus.

Since the invention is very fast, the only delay experienced by the voice packets is the time required to accumulate an individual packet. Packets received by the line interface module from the data bus are translated into the form required for the line device attached to it: analog voice for analog phones, digital voice for digital phones, etc. By detaching the voice data stream from the clocked TDM bus through the use of packets, the requirement for rigidly synchronizing all parts of the voice system to a single clock is eliminated. The problems with jitter and mismatched frame clocks go away.

Another exemplary use of the invention is a packet based IP switch. Many of the advantages listed in the PBX discussion above apply to this type of switch as well. However, in the case of the IP switch, the case for distributed processing becomes a larger argument in favor of the methods of the invention.

As the number of users of a switch increases, with the consequent increase in traffic, the invention allows interface modules containing processors for traffic management to be added as needed. Each interface module contains the physical layer, a classification pre-processor and a post-processor for traffic management. A host CPU, on board or external, performs system and common control functions.

Unlike other proposed architectures, the invention can utilize the same data transfer medium for transferring control messages between the host CPU and the interface modules as it does for the data traffic. It is not necessary to have a completely separate communication path for these control functions. Backplanes having busses 160 bits wide and running at 125 MHz would have a usable bandwidth of close to 20 gigabits.

It will also be appreciated that the methods and apparatus of the invention can be used to implement the communications bus in a computer.

In summary, the methods and apparatus of the invention actually become more efficient as usage increases. Because the addressing protocol of the invention is efficient, ports govern themselves in respect to bus access and there is no contention for control when a port has relinquished use of the bus.

Bidding is done in a controlled manner, with the port having the highest priority allowed to use the bus whenever two or more ports bid for access. Ports can be configured to handle any kind of traffic from POTS (plain old telephone service) to broadband data service. The bus protocol imposes very little overhead on the packet traffic.

The bus can be designed as a relatively inexpensive backbone capable of accepting a large number of ports. The basic configuration can be implemented relatively inexpensively. Expansion is modular, with processing being added with each new module in the exact amount required. The basic design is stackable, by adding connecting buffer ports between adjacent units. Priority of bus use is automatic. The bus is so designed that ports of less than 64 bits can operate on the bus without conflict.

There have been described and illustrated herein methods and apparatus for bit sensitive parallel bus peer addressing. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for performing bit sensitive peer addressing in a communications system including an n-bit parallel bus, a bid/busy line, an ack line and a clock line, together with a plurality of ports attached to said bus, where n is an integer, comprising the steps of:
   (a) assigning each port on said bus a unique address corresponding to a single bit data line of the n-bit bus;
   (b) bidding for control of said bus by utilizing a protocol that requires each port seeking control during a given clock cycle to drive its unique address bus bit line to a preassigned state via a single data trace when the bid/busy line is in a predetermined state;
   (c) utilizing said bid/busy line to address all of said ports in said clock cycle to carry a composition of port address bits corresponding to bus bid requests when the bid/busy line is in said predetermined state; and
   (d) simultaneously reading the contents of the bus at each port to determine if another port is driving its unique address bus bit line to said preassigned state, thus during a single bid clock cycle allowing multiple ports to drive the data bus simultaneously while reading said bus to determine if any competing bids have been placed for bus control.

2. A method according to claim 1 further comprising the steps of:
   (a) assigning each port a priority level; and
   (b) giving control of the communications system to the port with the highest priority when two or more ports bid at the same time for use of the communications system.

3. A method according to claim 2 further comprising the step of requiring a source port to assert the data line of the bus corresponding to the address of a destination port with which it will communicate after the source port takes control of the communications system.

4. A method according to claim 2 further comprising the step of requiring a source port to assert the data lines of the bus corresponding to the addresses of the destination ports with which it will communicate after the source port takes control of the communications system.

5. A method of arbitrating access to a communications bus having a plurality of ports wherein only one port can transmit data over the communications system at a time, comprising the steps of:
   (a) coupling each port to a bus having n parallel data lines, a clock line, and a bid/busy line, where n is an integer;
   (b) assigning each of the ports an address between 0 and (n−1);
   (c) requiring ports to assert the bid/busy line when a port is using the communications system;
   (d) allowing ports bid for use of the communications system when the bid/busy line is not asserted; and
   (e) requiring ports to bid for use of the communications system by asserting the data line of the bus corresponding to its address when the bid/busy line is not asserted.

6. A method according to claim 5 wherein control of the communications system is given to a bidding port in one clock cycle.

7. A method according to claim 5 further comprising the step of allowing a port to transmit data over the data lines of said bus when the port is given control of the communications system.

8. A method according to claim 5 further comprising the step of allowing a port to transmit data over a payload data path separate from said bus when the port is given control of the communications system.

9. A method according to claim 5 further comprising the steps of:
   (a) assigning each port a priority level; and
   (b) giving control of the communications system to the port with the highest priority when two or more ports bid at the same time for use of the communications system.

10. A method according to claim 5 further comprising the step of requiring a source port to assert the data line of the bus corresponding to the address of a destination port with which it will communicate.

11. A method according to claim 10 further comprising the steps of:
   (a) coupling said destination port to an ACK line; and
   (b) requiring said destination port to assert the ACK line if it is ready to receive data.

12. A method according to claim 5 further comprising the step of requiring a source port to assert the data lines of a plurality of data lines on the bus corresponding to the addresses of a plurality of destination ports with which said source port wants to communicate.

13. A method according to claim 12 further comprising the steps of:
   (a) coupling each of said destination ports to an ACK line; and
   (b) requiring said plurality of destination ports to assert the ACK line if they are ready to receive data when a port in control of the communications system asserts the data lines of the bus corresponding to the addresses of said plurality of destination ports.

14. A method according to claim 5 wherein whenever the number of ports, x, is greater than the number of data lines n, arbitration for control of the bus is completed in the greatest integer value of x/n clock cycles.

15. A method according to claim 5 further comprising the step of providing each port with bus interface circuitry coupled to the bus recited in the coupling step, line interface circuitry coupled to an external device, and control circuitry coupled to the bus interface circuitry and the line interface circuitry.

16. A method according to claim 15 wherein the bus interface circuitry includes an input FIFO coupled to the data lines of the bus, an output FIFO coupled to the data lines of the bus, and control logic coupled to the clock line, the bid/busy line and coupled said FIFOs.

17. A method according to claim 16 wherein the line interface circuitry includes a serializer coupled to the input FIFO, an output line driver coupled to the serializer, a deserializer coupled to the output FIFO, and an input line receiver coupled to the deserializer.

18. A method according to claim 17 wherein the control circuitry includes a RAM memory coupled to the input FIFO, the output FIFO, the serializer and the deserializer, and a processor coupled to the control logic, the input FIFO, the output FIFO, the serializer and the deserializer.

19. A method according to claim 5 wherein n=64.

20. A method according to claim 5 further comprising the step of arbitrating, within one clock cycle, among ports without the aid of a bus master, when two or more ports bid for use of the communications system at the same time.

21. A method according to claim 20 further comprising the steps of:

(a) assigning each port a priority level, and (b) giving control of the bus to the highest priority port when two or more ports bid for use of the communications system at the same time.

22. A method according to claim 21 further comprising the step of associating priority level with address.

23. A method according to claim 5 further comprising the steps of:

(a) coupling some of said ports to all n lines of the bus; and (b) coupling some of said ports to less than n lines of the bus.

24. A method according to claim 23 further comprising the steps of:

(a) assigning each port a priority level; and (b) giving control of the communications system to the port with the highest priority level when more than one port bids for use of the communications system at the same time.

25. A method according to claim 24 further comprising the step of assigning the ports coupled to less than n data lines a higher priority than the ports coupled to all n data lines.

* * * * *